US011263158B2

(12) United States Patent
Galles et al.

(10) Patent No.: US 11,263,158 B2
(45) Date of Patent: Mar. 1, 2022

(54) PROGRAMMABLE COMPUTER IO DEVICE INTERFACE

(71) Applicant: Pensando Systems Inc., Milpitas, CA (US)

(72) Inventors: Michael Brian Galles, Los Altos, CA (US); J. Bradley Smith, San Jose, CA (US); Hemant Vinchure, San Jose, CA (US)

(73) Assignee: PENSANDO SYSTEMS INC., Milpitas, CA (US)

( * ) Notice: Subject to any disclaimer, the term of this patent is extended or adjusted under 35 U.S.C. 154(b) by 0 days.

(21) Appl. No.: 16/971,898

(22) PCT Filed: Feb. 19, 2019

(86) PCT No.: PCT/US2019/018544
§ 371 (c)(1),
(2) Date: Aug. 21, 2020

(87) PCT Pub. No.: WO2019/164827
PCT Pub. Date: Aug. 29, 2019

(65) Prior Publication Data
US 2021/0103536 A1    Apr. 8, 2021

Related U.S. Application Data

(60) Provisional application No. 62/634,090, filed on Feb. 22, 2018.

(51) Int. Cl.
*G06F 3/06*        (2006.01)
*G06F 9/38*        (2018.01)
(Continued)

(52) U.S. Cl.
CPC .......... *G06F 13/28* (2013.01); *G06F 9/30036* (2013.01); *G06F 9/30079* (2013.01); *G06F 9/30101* (2013.01); *G06F 13/385* (2013.01)

(58) Field of Classification Search
None
See application file for complete search history.

(56) References Cited

U.S. PATENT DOCUMENTS

| 6,483,699 B1 | 11/2002 | Salmonson et al. |
| 6,906,920 B1 | 6/2005 | Whitted et al. |

(Continued)

FOREIGN PATENT DOCUMENTS

| CN | 1960335 A | 5/2007 |
| CN | 102104541 A | 6/2011 |

(Continued)

OTHER PUBLICATIONS

Bosshart et al. Forwarding Metamorphosis: Fast Programmable Match-Action Processing in Hardware for SDN. SIGCOMM' 13 Hong Kong, China Aug. 12-16, 2013 (Retrieved Apr. 23, 2019 from http://yuba.standford.edu/~grg/docs/sdn-chip-sigcomm-2013.pdf).

(Continued)

*Primary Examiner* — Hyun Nam
(74) *Attorney, Agent, or Firm* — Wilson Sonsini Goldstein & Rosati

(57) ABSTRACT

Methods and apparatuses for a programmable IO device interface are provided. The apparatus may comprise: a first memory unit having a plurality of programs stored thereon, the plurality of programs are associated with a plurality of actions comprising updating memory based data structure, inserting a DMA command or initiating an event; a second memory unit for receiving and storing a table result, and the table result is provided by a table engine configured to perform packet match operations on (i) a packet header vector contained in a header portion and (ii) data stored in a programmable match table; and circuitry for executing a program selected from the plurality of programs in response to the table result and an address received by the apparatus, (Continued)

and the program is executed until completion and the program is associated with the programmable match table.

26 Claims, 10 Drawing Sheets

(51) Int. Cl.
   *G06F 13/28* (2006.01)
   *G06F 9/30* (2018.01)
   *G06F 13/38* (2006.01)

(56) References Cited

U.S. PATENT DOCUMENTS

| | | | |
|---|---|---|---|
| 6,985,988 B1* | 1/2006 | Nsame | G06F 13/4027 |
| | | | 710/305 |
| 7,028,098 B2 | 4/2006 | Mate et al. | |
| 7,215,637 B1 | 5/2007 | Ferguson et al. | |
| 7,304,996 B1 | 12/2007 | Swenson et al. | |
| 7,409,476 B1 | 8/2008 | Liang et al. | |
| 7,418,536 B2 | 8/2008 | Leung, Jr. et al. | |
| 7,567,567 B2 | 7/2009 | Muller et al. | |
| 7,975,094 B2* | 7/2011 | Taylor | G06F 13/385 |
| | | | 711/100 |
| 8,190,807 B2* | 5/2012 | Reid | G06F 11/3636 |
| | | | 711/3 |
| 8,571,024 B2 | 10/2013 | Tatar et al. | |
| 9,071,504 B2 | 6/2015 | Ashida | |
| 9,294,386 B2 | 3/2016 | Narad | |
| 9,712,439 B2 | 7/2017 | Bosshart et al. | |
| 9,891,898 B1 | 2/2018 | Tonsing | |
| 9,912,610 B2 | 3/2018 | Bosshart et al. | |
| 10,511,523 B1 | 12/2019 | Bosshart et al. | |
| 10,523,578 B1 | 12/2019 | Li et al. | |
| 10,721,167 B1 | 7/2020 | Bosshart et al. | |
| 10,997,106 B1* | 5/2021 | Bandaru | G06F 13/4282 |
| 2003/0229738 A1* | 12/2003 | Zhuge | G06F 13/38 |
| | | | 710/100 |
| 2008/0101016 A1 | 5/2008 | Brooks et al. | |
| 2008/0262990 A1 | 10/2008 | Kapoor et al. | |
| 2010/0165991 A1* | 7/2010 | Veal | H04L 49/9094 |
| | | | 370/392 |
| 2011/0064084 A1 | 3/2011 | Tatar et al. | |
| 2012/0207158 A1* | 8/2012 | Srinivasan | H04L 12/18 |
| | | | 370/390 |
| 2013/0058335 A1 | 3/2013 | Koponen et al. | |
| 2014/0025852 A1* | 1/2014 | Ramakrishna | G06F 13/14 |
| | | | 710/110 |
| 2014/0241361 A1 | 8/2014 | Bosshart et al. | |
| 2014/0241362 A1 | 8/2014 | Bosshart et al. | |
| 2014/0244966 A1 | 8/2014 | Bosshart et al. | |
| 2014/0328344 A1 | 11/2014 | Bosshart | |
| 2015/0304212 A1 | 10/2015 | Zhou | |
| 2017/0093986 A1 | 3/2017 | Kim et al. | |
| 2017/0093987 A1 | 3/2017 | Sivaraman Kaushalram et al. | |
| 2020/0336425 A1* | 10/2020 | Galles | H04L 45/7457 |

FOREIGN PATENT DOCUMENTS

| | | |
|---|---|---|
| CN | 102238083 A | 11/2011 |
| WO | WO-2019090247 A1 | 5/2019 |
| WO | WO-2019164827 A1 | 8/2019 |

OTHER PUBLICATIONS

PCT/US2018/059251 International Search Report and Written Opinion dated Feb. 13, 2019.
PCT/US2019/018544 International Search Report and Written Opinion dated May 22, 2019.
Shiomoto. Research Challenges for Network Function Virtualization—Re-Architecting Middlebox for High Performance and Efficient, Elastic and Resilient Platform to Create New Services. IEICE Transactions on Communications E101-B(1):96-122 (2018).
U.S. Appl. No. 16/761,659 Office Action dated Jul. 15, 2021.
Bosshart et al.: P4: Programming protocol-independent packet processors. ACM SIGCOMM Computer Communication Review 44(3):87-95 URL: https://dl.acm.org/doi/10.1145-2656877.2656890 (2014).
Sivaraman et al..: DC.p4: programming the forwarding plane of a data-center switch. SOSR 2015: Proceedings of the 1st ACM SIGCOMM Symposium on Software Defined Networking Research Jun. 2015 Article No.: 2, pp. 1-8 URL: https://doi.org/10.1145/2774993.2775007 (2015).
U.S. Appl. No. 16/761,659 Final Office Action dated Dec. 20, 2021.

\* cited by examiner

| Byte Offset | |
|---|---|
| 00h | Device ID / Vendor ID |
| 04h | Status / Command |
| 08h | Class Code / Revision ID |
| 0Ch | BIST / Header Type / Latency Timer / Cache Line Size |
| 10h | Base Address Registers |
| 14h | |
| 18h | |
| 1Ch | |
| 20h | |
| 24h | |
| 28h | Cardbus CIS Pointer |
| 2Ch | Subsystem ID / Subsystem Vendor ID |
| 30h | Expansion ROM Base Address |
| 34h | Reserved / Capabilities Pointer |
| 38h | Reserved |
| 3Ch | Max_lat / Min_Gnt / Interrupt Pin / Interrupt Line |

PROGRAMMABLE COMPUTER IO DEVICE INTERFACE

CROSS-REFERENCE TO RELATED APPLICATIONS

This application is the National Stage entry of International Application No. PCT/US2019/018544, filed Feb. 19, 2019, which claims the priority and benefit of U.S. Provisional Application No. 62/634,090 filed Feb. 22, 2018, Entitled: PROGRAMMABLE COMPUTER IO DEVICE INTERFACE, the entire contents of which are incorporated herein by reference in their entirety.

BACKGROUND OF THE INVENTION

Computing environments may include hosts such as servers, computers running one or more processes, such as virtual machines or containers. The hosts and/or processes may be configured to communicate with other processes or devices over a computing network. The host systems interface with the computing network via input/output (TO) devices (e.g., network interface cards (NICs)).

Computer systems interface to IO devices through a specified set of device registers and memory based data structures. These registers and data structures are usually fixed for a given IO device, allowing a specific device driver program to run on the computer system and control the IO device. In a data communication network, network interfaces are normally fixedly defined control structures, descriptors, registers and the like. Networking data and control structures are memory based and access memory using direct memory access (DMA) semantics. Network systems such as switches, routing devices, receive messages or packets at one of a set of input interfaces and forward them on to one or more of a set of output interfaces. Users typically require that such routing devices operate as quickly as possible in order to keep pace with a high rate of incoming messages. One challenge associated with network systems relates to providing flexible network interfaces so as to adapt to changes in the network device structure and feature set, various protocols, operating systems, applications, and the rapid development of device models.

SUMMARY OF THE INVENTION

It is desirable to provide a flexible and fully programmable IO device interface mechanism such that an IO device can be customized to be better suited for the application or OS interface required. There exists a need to provide a programmable IO device interface to work with a highly configurable network pipeline, a customizable host interface, and flexible hardware offloads for storage, security, and network functions with improved performance and within target power budgets. The present invention addresses this need and provides related advantages as well.

The subject matter disclosed herein meets this need by providing a device interface that is programmable in the form of device data structures and control registers as well as to define the device behavior to coordinate with the device interface. The programmable IO device interface may be capable to work with a highly configurable network pipeline, a customizable host interface, and flexible hardware offloads for storage, security, and network functions with improved performance and within target power budgets. An IO device with the provided device interface may have improved performance. The provided device interface mechanism may allow the IO device interface to emulate existing host software drivers and to interact with various different software drivers efficiently.

The performance of the IO device may be improved by replacing the conventional fixed function direct memory access (DMA) engine, control registers and device state machines with a programmable pipeline of match, action and DMA stages. For example, a stage in the pipeline may initiate DMA read and write operations to the host system, fetching memory based descriptors, scatter gather lists (SGL), or custom data structure which describe I/O operations. The provided interface mechanism may comprise describing host computer data structures using a stack of fields which map to the data structures (e.g., descriptor is used to describe how a packet is made, different types of packets); storing internal DMA engine state in programmable match tables which can be updated by the hardware pipeline (e.g., match processing unit (MPU)) as well as by the host processor; describing device registers by a separate of programmable field definitions and backed by hardware mechanisms through address remapping mechanisms. The above interface mechanism enables the IO device to directly interact with host data structures without the assistance of the host system thus allowing lower latency and deeper processing in the IO device.

The IO device interface may be a highly optimized ring based I/O queue interface with an efficient software programming model to deliver high performance with CPU and Peripheral Component Interconnect Express® (PCIe) bus efficiency. An IO device may be connected to a processor of a host computer system via the PCIe bus. The IO device may interface to a host system via one or more (e.g., one to eight) physical PCIe interfaces.

The IO device may break down a packet processing task into a series of table lookups or matches, accompanied by processing actions. A match processing unit (MPU) may be provided to perform the table-based actions in each stage of a network pipeline. One or more MPUs may be combined with a table engine, which is configured to extract a programmable set of fields and fetch a table result. Once the table engine has completed fetching the lookup result, it may deliver the table result and relevant packet header fields to an MPU for processing. The MPU may run a targeted program based on a domain specific instruction set and the MPU may take the table lookup result and packet headers as inputs and produce table updates and packet header rewrite operations as outputs. A pre-determined number of such table engines and MPU pipeline stages may be combined to form a programmable pipeline which is capable of operating at a high rate of packet processing. This prevents the MPUs from experiencing a data miss stall, and allows the MPU programs executed in a deterministic time, then pipelined together to maintain a target packet processing rate. In some cases, the programmer or compiler may decompose the packet processing program into a set of dependent or independent table lookup and action processing stages (match+ action) which are mapped onto the table engine and MPU stages respectively. In some instances, if the required number of stages exceeds the implemented number of stages, a packet may be recirculated for additional processing.

Accordingly, in one aspect, disclosed herein is method for a programmable IO device interface. The method comprises: providing programmable device registers, memory based data structures, a DMA block, and a pipeline of processing entities configured to: (a) receive a packet comprising a header portion and a payload portion, wherein the header portion is used to generate a packet header vector; (b)

produce, with aid of a table engine, a table result by performing packet match operations, wherein the table result is generated based at least in part on the packet header vector and data stored in a programmable match table; (c) receive, at a match processing unit, the table result and an address of a set of instructions associated with the programmable match table; (d) perform, by the match processing unit, one or more actions according to the loaded set of instructions until completion of the instructions, wherein the one or more actions comprise updating the memory based data structure, inserting a DMA command and/or initiating an event; and (e) perform, by the DMA block, a DMA operation according to the inserted DMA command.

In some embodiments, the method further comprises providing the header portion to a succeeding circuit, wherein the succeeding circuit is configured to assemble the modified header portion to the corresponding payload portion.

In some embodiments, the programmable match table comprises DMA register tables, descriptor formats, or control register formats. In some cases, the programmable match table is selected based on packet type information related to a packet type associated with the header portion. In some cases, the programmable match table is selected based on an ID of the match table selected by a previous stage or previous pipelined stages.

In some embodiments, the table result comprises a key related to the programmable match table and the match result of the match operation. In some embodiments, the memory unit of the match processing unit is configured to store a plurality of sets of instructions. In some cases, the plurality sets of instructions are associated with different actions. In some cases, a set of instructions is stored in a contiguous region of the memory unit and the contiguous region is identified by the address.

In some embodiments, the one or more actions further comprise updating the programmable match table. In some embodiments, the method further comprises locking the match table for an exclusive access by the match processing unit while the match table is processed by the match processing unit. In some embodiments, the packets are processed in a stalling-free manner.

In a related yet separate aspect, an apparatus with programmable IO device interface is provided. The apparatus comprises: (a) a first memory unit having a plurality of programs stored thereon, wherein the plurality of programs are associated with a plurality of actions comprising updating memory based data structure, inserting a DMA command or initiating an event; (b) a second memory unit for receiving and storing a table result, wherein the table result is provided by a table engine configured to perform packet match operations to a packet header vector contained in the header portion and data stored in a programmable match table; and (c) circuitry for executing a program selected from the plurality of programs in response to an address received by the apparatus and the table result, wherein the program is executed until completion and the program is associated with the programmable match table.

In some embodiments, the apparatus is configured to provide the header portion to a succeeding circuit. In some cases, the succeeding circuit is configured to assemble the modified header portion to the corresponding payload portion.

In some embodiments, the programmable match table comprises DMA register tables, descriptor formats, or control register formats. In some cases, the programmable match table is selected based on packet type information related to a packet type associated with the header portion. In some cases, the programmable match table is selected based on an ID of the match table selected by a previous stage.

In some embodiments, each of the plurality of programs comprises a set of instructions stored in a contiguous region of the first memory unit, and the contiguous region is identified by the address. In some embodiments, the one or more actions comprise updating the programmable match table. In some embodiments, the event is not related to modifying the header portion of the packet. In some embodiments, the memory based data structure comprises at least one of the following: management token, administrative command, processing tokens for initiating an event.

A system comprising a plurality of the apparatuses, wherein the plurality of apparatuses are coordinated to perform the set of instructions or one or more actions concurrently or sequentially according to a configuration. In some embodiments, the configuration is determined by an application instruction received from a main memory of a host device operably coupled to the plurality of apparatuses. In some embodiments, the plurality of apparatuses are arranged to process the packets according to pipeline of stages.

It shall be understood that different aspects of the invention can be appreciated individually, collectively, or in combination with each other. Various aspects of the invention described herein may be applied to any of the particular applications set forth below or for any other types of the data processing system disclosed herein. Any description herein concerning the data processing may apply to and be used for any other data processing situations. Additionally, any embodiments disclosed in the context of the data processing system or apparatuses are also applicable to the methods disclosed herein.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 3A is a diagram shows an example of an internal arrangement of a PCIe configuration register;

DETAILED DESCRIPTION OF THE INVENTION

Figure 1:
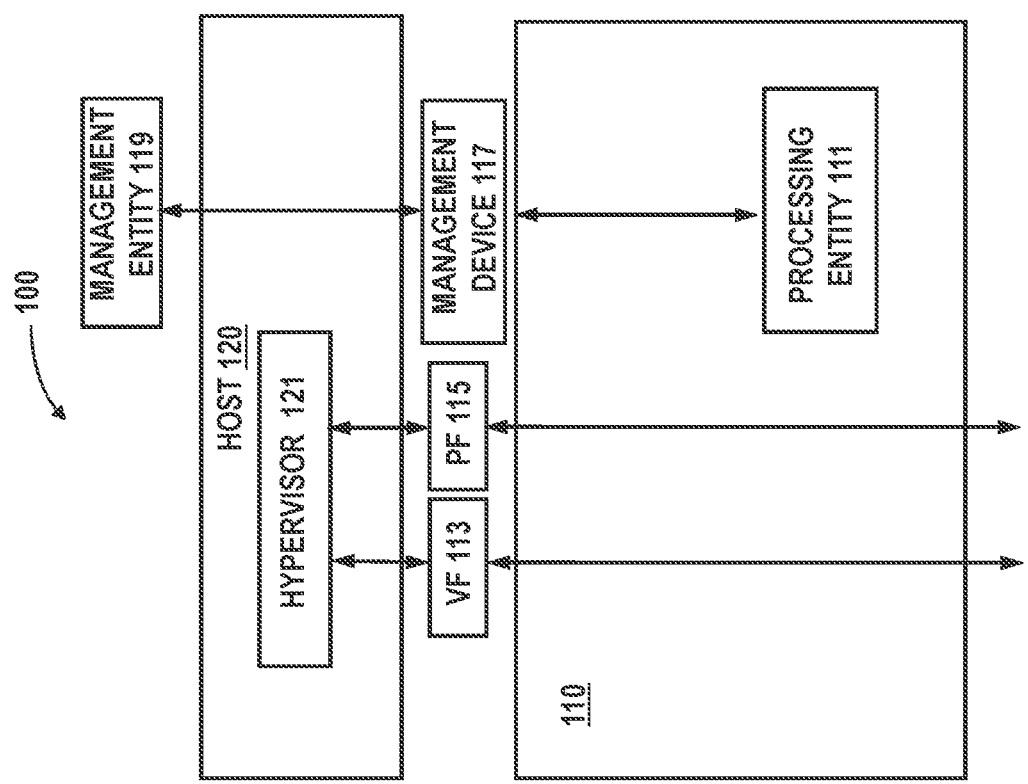
FIG. 1 shows block diagram of an exemplary computing system architecture, in accordance with embodiments of the invention.

Described herein, in certain embodiments, are disclosed herein are network appraratuses, system, and methods for processing data, such as packets or tables, with reduced data stalls.

Certain Definitions

Unless otherwise defined, all technical terms used herein have the same meaning as commonly understood by one of ordinary skill in the art to which this invention belongs.

As used herein, the singular forms "a," "an," and "the" include plural references unless the context clearly dictates otherwise. Any reference to "or" herein is intended to encompass "and/or" unless otherwise stated.

Reference throughout this specification to "some embodiments," or "an embodiment," means that a particular feature, structure, or characteristic described in connection with the embodiment is included in at least one embodiment. Thus, the appearances of the phrase "in some embodiment," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," "unit," "block," "device" and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Moreover, the word "exemplary" where used herein to means serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Embodiments of the invention may be used in a variety of applications. Some embodiments of the invention may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, a wireless communication station, a wireless communication device, a wireless access point (AP), a modem, a network, a wireless network, a local area network (LAN), a wireless LAN (WLAN), a metropolitan area network (MAN), a wireless MAN (WMAN), a wide area network (WAN), a wireless WAN (WWAN), a personal area network (PAN), a wireless PAN (WPAN), devices and/or networks operating in accordance with existing IEEE 802.11, 802.11a, 802.11b, 802.11e, 802.11g, 802.11h, 802.11i, 802.11n, 802.16, 802.16d, 802.16e standards and/or future versions and/or derivatives and/or long term evolution (LTE) of the above standards, units and/or devices which are part of the above networks, one way and/or two-way radio communication systems, cellular radio-telephone communication systems, a cellular telephone, a wireless telephone, a personal communication systems (PCS) device, a PDA device which incorporates a wireless communication device, a multiple input multiple output (MIMO) transceiver or device, a single input multiple output (SIMO) transceiver or device, a multiple input single output (MISO) transceiver or device, or the like.

The term "table" refers to a variety types of tables involved in data or packet processing. For example, the table may be match tables used in the match+action stages, such as forwarding tables (e.g., hash tables for Ethernet address lookup, the longest-prefix match tables for IPv4 or IPv6, wildcard lookups for Access Control Lists (ACLs)). These tables may be stored in various memory locations such as in internal static random access memory (SRAM), network interface card (NIC) DRAM, or host memory.

The term "match+action" refers to the paradig for network packet switching (such as those performed by an OpenFlow switch or P4 pipeline, which uses match tables, action tables, statistics memories, meters memories, stateful memories, and ternary indirection memories). The term "P4" referes to a high-level language for programming protocol-independent packet processors. P4 is a declarative language for expressing how packets are processed by the pipeline of a network forwarding element such as a switch, NIC, router or network function appliance. It is based upon an abstract forwarding model consisting of a parser and a set of match+action table resources, divided between ingress and egress. The parser identifies the headers present in each incoming packet. Each match+action table performs a lookup on a subset of header fields and applies the actions corresponding to the first match within each table.

While portions of this disclosure, for demonstrative purposes, refer to wired and/or wired communication systems or methods, embodiments of the invention are not limited in this regard. As an example, one or more wired communication systems, can utilize one or more wireless communication components, one or more wireless communication methods or protocols, or the like.

Although some portions of the discussion herein may relate, for demonstrative purposes, to a fast or high-speed interconnect infrastructure, to a fast or high-speed interconnect component or adapter with OS bypass capabilities, to a fast or high-speed interconnect card or Network Interface Card (NIC) with OS bypass capabilities, or to a to a fast or high-speed interconnect infrastructure or fabric, embodiments of the invention are not limited in this regard, and may be used in conjunction with other infrastructures, fabrics, components, adapters, host channel adapters, cards or NICs, which may or may not necessarily be fast or high-speed or with OS bypass capabilities. For example, some embodiments of the invention may be utilized in conjunction with InfiniBand (IB) infrastructures, fabrics, components, adapters, host channel adapters, cards or NICs; with Ethernet infrastructures, fabrics, components, adapters, host channel adapters, cards or NICs; with gigabit Ethernet (GEth) infrastructures, fabrics, components, adapters, host channel adapters, cards or NICs; with infrastructures, fabrics, components, adapters, host channel adapters, cards or NICs that have OS with infrastructures, fabrics, components, adapters, host channel adapters, cards or NICs that allow a user mode application to directly access such hardware and bypassing a call to the operating system (namely, with OS bypass capabilities); with infrastructures, fabrics, components, adapters, host channel adapters, cards or NICs; with infrastructures, fabrics, components, adapters, host channel adapters, cards or NICs that are connectionless and/or stateless; and/or other suitable hardware.

Computer systems employ a wide variety of peripheral components or IO devices. An example of a host processor of a computer system connected to IO devices through a component bus defined by Peripheral Component Interconnect Express (PCIe), a high-speed serial computer expansion bus standard. Device drivers (also referred to as drivers) are hardware-specific software which controls the operation of hardware devices connected to computing systems.

In computing, virtualization techniques are used to allow multiple operating systems to simultaneously share processor resources. One such virtualization technique is Single Root I/O Virtualization (SR-IOV), which is described in the PCI-SIG Single Root I/O Virtualization and Sharing Specifications. A physical IO device may allow multiple virtual machines to use the device concurrently through SR-IOV. In SR-IOV, a physical device may have physical functions (PFs) that allow for input/output operations and device configuration, as well as one or more virtual functions (VFs) that allow for data input/output. According to SR-IOV, a Peripheral Component Interconnect Express (PCIe) device can appear to be multiple separate physical PCIe devices. For example, a SR-IOV network interface card (NIC) having a single port can have up to 256 virtual functions, with each virtual function representing a respective NIC port.

In one aspect, a programmable device interface is provided. The device interface may be a highly optimized ring based I/O queue interface with an efficient software programming model to deliver high performance with CPU and PCIe bus efficiency. FIG. 1 shows a block diagram of an exemplary computing system architecture 100, in accordance with embodiments of the invention. A hypervisor 121 on the host computing system 120 may interact with the physical IO device 110 using the PFs 115 and one or more VFs 113. As illustrated, the computing system 110 may comprise a management device 117 configured for management of the interface devices. The management device 117 may be in communication with a processing entity 111 (e.g., ARM cores) and a management entity 119 (e.g., management virtual machine system). It should be noted that the illustrated computing system is only an example mechanism, without suggesting any limitation as to the scope of the invention. The provided programmable IO interface and methods can be applied to any operating-system-level virtualization (e.g., container and docker system) or machine level virtualization or computing system without virtualization features.

The hypervisor 121 generally provides operating system functionality (e.g., process creation and control, file system process threads, etc.) as well as CPU scheduling and memory management for the host. In some cases, the host computing system 120 may include programs that implement a machine emulator and virtualizer. The machine emulator and virtualizer may assist in virtualizing respective computer IO devices in virtual machines, such as virtualized hard disks, compact disk drives, and NICs. Virtio is a virtualization standard for implementing virtual IO devices in a virtual machine and may be considered as an abstraction for a set of common emulated devices in a hypervisor.

The provided programmable IO device interface mechanism allows for native hardware speeds when using the device emulator. The programmable IO device interface allows the host system to interface with the IO device with existing device drivers without reconfiguration or modification. In some cases, the VF device, PF device and management device may have similar driver interface such that such devices can be supported by a single driver. Such devices may, in some cases, be referred to as Ethernet devices.

The IO device 110 may provide a variety of services and/or functionality to an operating system operating as a host on computing system 110. For example, the IO device may provide network connectivity functions to the computing system, coprocessor functionality (e.g., graphics processing, encryption/decryption, database processing, etc.) and the like. The IO device 110 may interface with other components in the computing system 100 via, for example, a PCIe bus.

As mentioned above, SR-IOV specification enables a single root function (for example, a single Ethernet port) to appear to virtual machines as multiple physical devices. A physical IO device with SR-IOV capabilities may be configured to appear in the PCI configuration space as multiple functions. The SR-IOV specification supports physical functions and virtual functions.

Physical functions are full PCIe devices that may be discovered, managed, and configured as normal PCI devices. Physical functions configured and manage the SR-IOV functionality by assigning virtual functions. The IO device may expose one or more physical functions (PFs) 115 to a host computing system 120 or hypervisor 121. The PFs 115 may be full-featured PCIe devices that include all configuration resources and capabilities for the IO device. In some cases, the PFs may be PCIe functions that include SR-IOV extended capability, which facilitates the configuration or management of the IO device. The PF device is essentially a base controller of the Ethernet device. The PF device may be configured with up to 256 VFs. In some cases, the PFs may include extended operations such as allocating, configuring and freeing a VF, discovering hardware capabilities of the VF, such as Receive Side Scaling (RSS), discovering hardware resources of the VF, such as number of queues and interrupts resources, configuring the hardware resources and features of a VF, saving and restoring hardware state and the like. In some instances, the PF device may be configured as a boot device which may present an Option ROM base address registers (BAR).

The IO device may also provide one or more virtual functions (VFs) 113. The VFs may be lightweight PCIe functions that contain the resources necessary for data movement, but may have a minimized set of configuration resources. In some cases, the VFs may include lightweight PCIe functions that support SR-IOV. To use SR-IOV devices in a virtualized system, the hardware may be configured to create multiple VFs. These VFs may be made available to the hypervisor for allocations to virtual machines. The VFs may be manipulated (e.g., created, configured, monitored, or destroyed) for example, by the SR-IOV physical function device. In some cases, each of the multiple VFs is configured with one or more base address registers (BARs) to map NIC resources to the host system. A VF may map one or more logical interfaces (LIFs) or port, which are used in the IO device for forwarding and transaction identification. A LIF may belong to only one VF. Within a physical device, all virtual functions may have an identical BAR resource layout, stacked sequentially in host PCIe address space. The IO device PCIe interface logic may be programmed to map control registers and NIC memory regions with programmable access permissions (e.g., read, write, execute) to the VF BARs.

The IO device may comprise a management device 117 for management of the IO device. The management device 117 may not have direct access to the network uplink ports. The management device may be in communication with the processing entity 111. For example, the traffic on the management device may be steered to internal receive queues for processing by the management software on the processing entity 111. In some cases, the management device may be made available to pass through the hypervisor to a management entity 119 such as a management virtual machine. For example, the management device 117 may be assigned a device ID different from the PF device 115, such that a device driver in the hypervisor may be released for the PF device when the PF device does not claim the management device.

Figure 2:
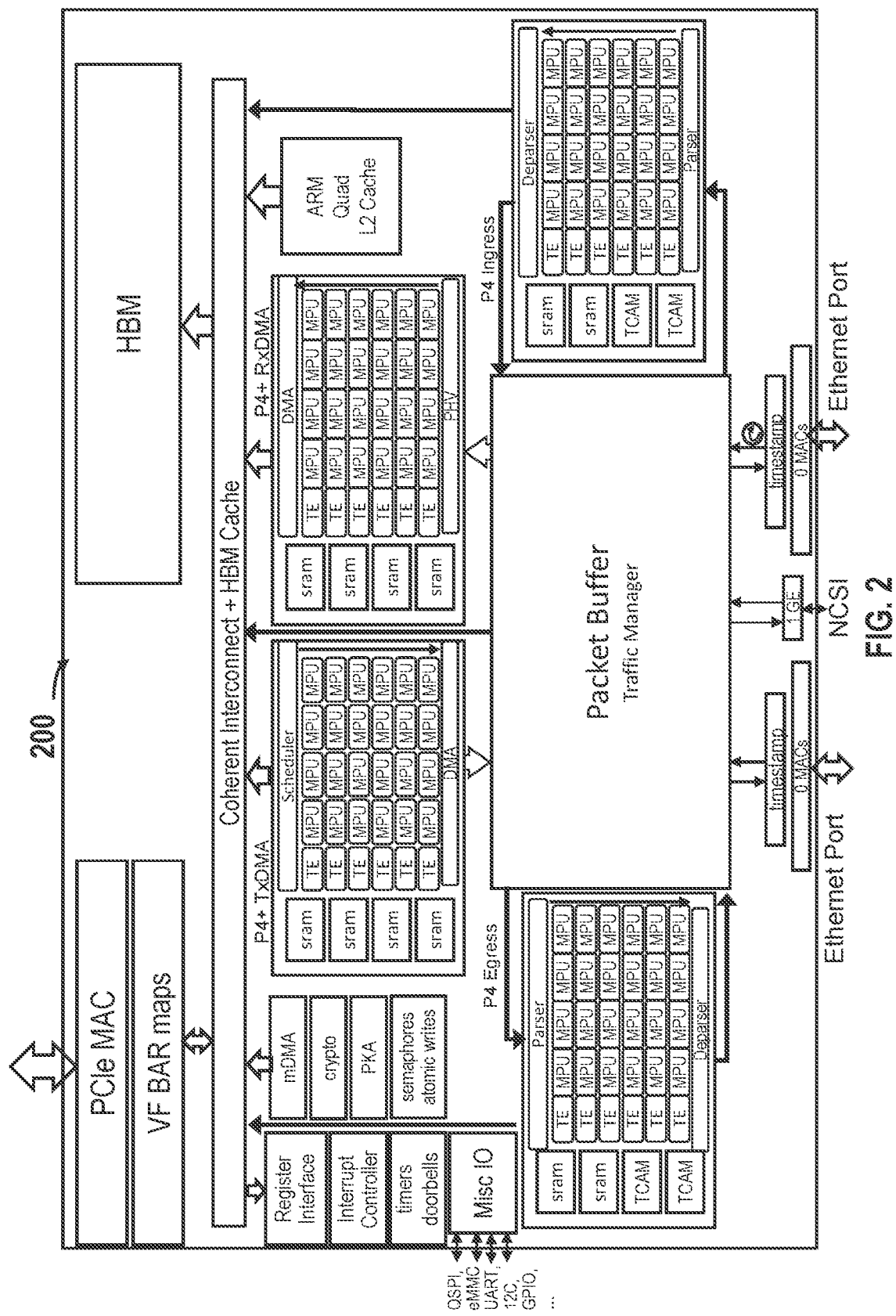
FIG. 2 shows exemplary configurations of multiples MPUs for executing a program.

FIG. 2 shows another exemplary IO device system 200 with described programmable device interface, in accordance with some embodiments of the invention. The system 200 serves as an example of implementing the P4 and extended P4 pipelines and various other functions to provide an improved network performance. In some cases, the device interface may have improved network performance by: not requiring PCIe bus register reads in the packet transmit or receive path; providing a single posted (non-blocking) PCIe bus register write for packet transmit; supporting for message signaled interrupts (MSI) and message signaled interrupts-extended (MSI-X) modes with driver-configurable interrupt moderation for high-performance interrupt processing; supporting I/O queues with outstanding requests (e.g., up to 64 k) per queue; transmitting TCP segmentation Offload (TSO) with improved send size; providing Transmission Control Protocol (TCP)/User Datagram Protocol (UDP) checksum offload; supporting for a variable number of Receive Queues to support industry standard Receive Side Scaling (RSS); supporting SR-IOV with up to 255 virtual functions.

The IO device system 200 may be the same IO device as described in FIG. 1 and implemented as a rack mounted device and comprise one or more Application Specific Integrated Circuits (ASICS) and/or boards with components mounted thereon. As shown in FIG. 2, the system 200 may comprise four advanced RISC machine (ARM) processors with coherent L1 and L2 caches, a shared local memory system, flash non-volatile memory, DMA engines, and miscellaneous IO devices for operation and debug. The ARM processors may observe and control all NIC resources via an address map. The ARM processor may implement the P4 pipeline and the extended P4 pipeline as described later herein.

The system may comprise a host interface and a network interface. The host interface may be configured to provide communication link(s) with one or more hosts (e.g., host servers). The host interface block may also observe regions of the address space via PCIe BAR maps to expose NIC functions to a host system. In an example, the address map may be initially created according to the principles of ARM memory maps, ARM limited, which provides SOC addressing guidelines for a 34-bit memory map.

The network interface may support network connections or uplinks with a computing network that may be, for example, a local area network, wide area network and various others as described elsewhere herein. The physical link may be controlled by a management agent (e.g., management entity 119) through the device driver. For example, the physical link may be configured via a "virtual link" associated with a device logical interface (LIF).

All memory transactions in the system 200, including host memory, high bandwidth memory (HBM), and registers may be connected via a coherent network on a chip (NOC) based on IP from an external Systems. The NOC may provide cache coherent interconnect between the NOC masters, including P4 pipeline, extended P4 pipeline, DMA, PCIe, and ARM. The interconnect may distribute HBM memory transactions across a plurality (e.g., 16) of HBM interfaces using a programmable hash algorithm. All traffic targeting HBM may be stored in the NOC cache (e.g., 1 MB cache). The NOC cache may be kept coherent with the ARM caches. The NOC cache may be used to aggregate HBM write transactions which may be smaller than the cache line (e.g., size of 64 bytes), as the HBM is not efficient when processing small writes. The NOC cache may have high bandwidth, supporting up to 3.2 Tb/s operation as it fronts the 1.6 Tb/s HBM.

The system may comprise an internal HBM memory system for running Linux, storing large data structures such as flow tables and other analytics, and providing buffering resources for advanced features including TCP termination and proxy, deep packet inspection, storage offloads, and connected FPGA functions. The memory system may comprise a HBM module which may support 4 GB capacity or 8 GB capacity, depending on package and HBM.

As mentioned above, the system may comprise a PCIe host interface. The PCIe host interface may support a bandwidth of, for example, 100 Gb/s per PCIe connection (e.g., dual PCIe Gen4x8 or single PCIe Gen3x16). A mechanism or a scheme to map resources available at the IO device to memory-mapped control regions associated with the virtual IO devices may be implemented by using a pool of configurable PCIe Base Address Registers (BARs) coupled with a resource mapping table to store mapping information for each virtual IO device. The IO resources provided by the IO device may be mapped to host addresses in the framework of the PCIe standard such that the same device drivers that are utilized to communicate with physical PCIe devices may be utilized to communicate with corresponding virtual PCIe devices.

The IO device interface may comprise programmable registers. These registers may comprise, for example, PCIe base address registers (BARs) that may include a first memory BAR containing device resources (e.g., device command registers, doorbell registers, interrupt control registers, interrupt status registers, MSI-X interrupt table, MSI-X interrupt pending bit array, etc.) a second BAR containing device doorbells pages, and a third BAR for mapping a controller memory buffer.

The device command registers are a set of registers used for submitting administrative commands to the hardware or firmware. For example, the device command registers may specify a single-64 byte command and a single 16-byte completion response. This register interface may allow for a single command outstanding at a time. The device command doorbell is a special purpose doorbell used to signal a command is ready in the device command registers.

The second BAR may contain doorbells pages. The general form of the second BAR may contain multiple LIFs with multiple doorbell pages per LIF. A network device (i.e., IO device) may have at least one LIF with at least one doorbell page. Any combination of single/many LIFs with single/many Doorbell Pages is possible and the driver may be prepared to identify and operate the different combinations. In an example, doorbell pages may be presented on a 4k stride by default to match a common system page size. The stride between doorbell pages may be adjusted in the virtual function device 113 to match the system page size configuration setting in the SR-IOV capability header in the parent physical function device 115. This page size separation allows protected independent direct access to a set of doorbell registers by processes by allowing each process to map and access a doorbell page dedicated for its use. Each page may provide the doorbell resources needed to operate the data path queue resources for a LIF, while protecting access to those resources from another process.

The doorbell register may be written by software to adjust a queue's producer index. Adjusting the producer index is the mechanism to transfer ownership of queue entries in the queue descriptor ring to the hardware. Some doorbell types, such as the Admin Queue, Ethernet Transmit Queue, and RDMA Send Queue, may cause the hardware queue to schedule further processing of the descriptors available in the queue. Other queue types, such as Completion Queues and Receive Queues, may require no further action from the hardware queue after updating the producer index.

The interrupt status register may contain a bit for each interrupt resource of the device. The register may have a bit set indicating the corresponding interrupt resource has asserted its interrupt. For example, bit 0 in Interrupt Status indicates interrupt resource 0 is asserted, bit 1 indicates interrupt resource 1 is asserted.

The controller memory buffer may be a region of general purpose memory resident on the IO device. The user or kernel driver may map in this controller memory BAR, and build descriptor rings, descriptors, and/or payload data in the region. A bit may be added in the descriptor to select whether the descriptor address field is interpreted as a host memory address, or as an offset relative to the beginning of the device controller memory window. The extended P4 program may set a designated bit (e.g., bit 63) of the address if it is a host address, or clear the bit and add the device controller memory base address to the offset when building the TxDMA operations for the DMA stage.

The MSI-X resources may be mapped through the first BAR and the format may be described by the PCIe Base Specification. The MSI-X interrupt table is a region of control registers that allows an OS to program MSI-X interrupt vectors on behalf of the driver.

The MSI-X Interrupt Pending Bit Array (PBA) is an array of bits, one for each MSI-X interrupt supported by the device.

The IO device interface may support programmable DMA register tables, descriptor formats, and control register formats, allowing specialized VF interfaces and user defined behaviors. The IO device PCIe interface logic may be programmed to map control registers and NIC memory regions with programmable access permissions (e.g., read, write, execute) to the VF BARs.

FIG. 3A is a diagram shows an example 300 of an internal arrangement of a PCIe configuration register. As examples of the addresses, the device ID designates a device number specific to a vendor, the vendor ID designates the number of a manufacturer (both offset 00h), and the class code (offset 08h) designates a device attribute. Addresses offset 10h-24h and 30h are used for base address registers. Configuration software included in the SR-PCIM can identify a device by looking up the register values. The base address registers are used by the configuration software in the SR-PCIM for writing a base address when allocating an address space for an I/O device. The device identification and related processes occur during PCIe configuration cycles. Such configuration cycles occur during system startup and possibly after a hot-plugging operation.

Figure 3B:
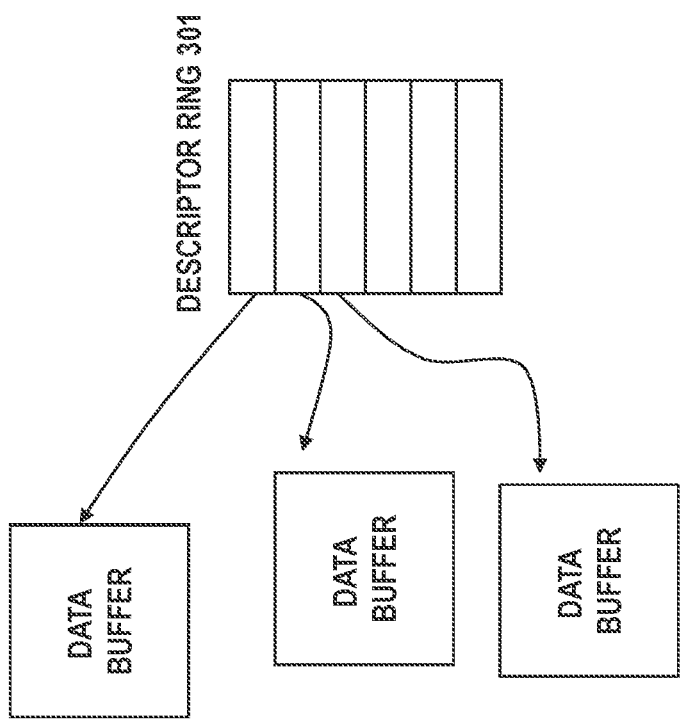
FIG. 3B shows examples of P4 defined descriptor rings.

The transmission ring may include a ring buffer. FIG. 3B shows examples of P4 defined descriptor rings 301. In some cases, the memory structures of the IO device interface may be defined in the descriptor formats. In the example, the receive queue (RxQ) descriptor may have the following fields:

```
// Basic RxQ receive descriptor
header_type rx_desc_t {
    fields {
        buffer_addr : 64; //buffer address
        buffer_size : 14; // length of the buffer
        flags : 2;
        pad : 16;
    }
}
    // RxQ Configuration Registers
    header_type rxq_config_t {
        ring_base : 64;
        ring_size_log : 4;
        p_index: 16; //producer index, set by doorbell register
        c_index: 16; // set by doorbell register
        s_index: 16; // saved (cache) index
        enable: 1;
    }
```

In the case of transmission queue, the transmission queue descriptor may have a single DMA address field for the first data buffer fragment to send. If there is only one fragment, then the single DMA address is sufficient to send the entire packet. In the case of more than one fragment, a transmit scatter-gather list may be used to describe the DMA address and the length of the subsequent fragments.

As mentioned above, the provided IO device interface extends the P4 programmable pipeline mechanism to the host driver. For example, P4 programmed DMA interfaces may be presented directly to host virtual functions and the processing entity (e.g., ARM CPU) of the network device or the offload engine interfaces. The IO device interface may support up to 2048 or more PCIe virtual functions for direct container mapping with multiple transmit and receive queues. Combining the programmable IO device interface with the P4 pipeline features allows the host virtual switch/ NIC to be offloaded to the programmable network device with improved bandwidth and low latency.

Match Processing Unit (MPU)

In an aspect of the invention, a match processing unit (MPU) is provided to process a data structure. The data structure may comprise various types such as data packet, a management token, administrative command from a host, a processing token, a descriptor ring and various others. The MPU may be configured to perform various operations according to the type of data being processed or different purposes. For example, the operations may include table-based actions for processing packets, table maintenance operations such as writing a timestamp to a table or harvesting table data for export, administrative operations such as creating new queues or memory maps, gathering statistics, and various other operations such as initiating a bulk data processing that may result in writing any type of modified data to the host memory.

In some embodiments, the MPU may process a data structure in order to update the memory based data structure or initiate an event. The event may involve modifying a packet such as modifying the PHV field of the packet as described elsewhere herein. Alternatively, the event may not relate to modifying or updating a packet. For instance, the event may be administrative operations such as creating new queues or memory maps, gathering statistics, initiating a bulk data processing that may result in writing any type of modified data to the host memory, or performing calculations on descriptor rings, scatter gather lists (SGLs).

Figure 4:
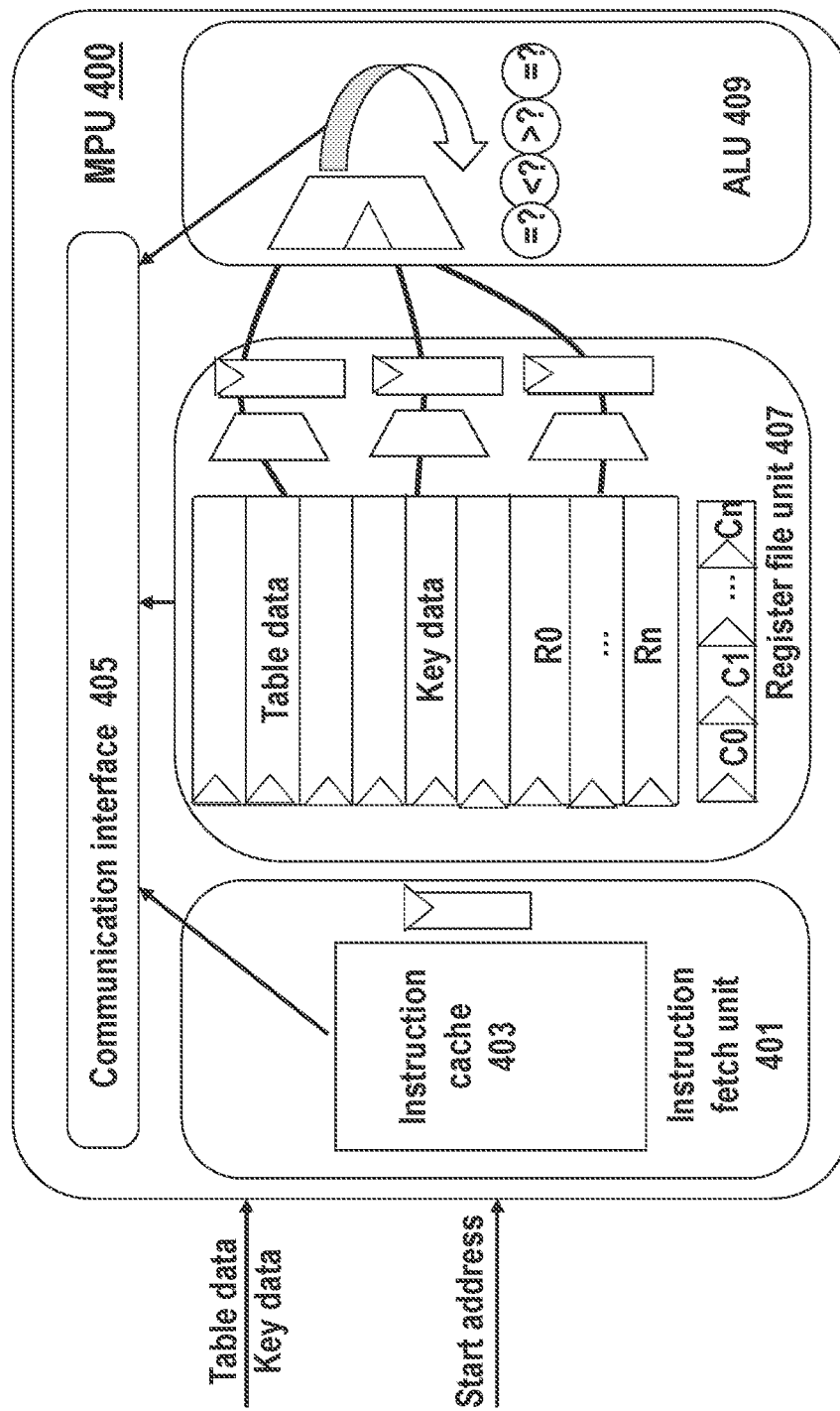
FIG. 4 shows a block diagram of a match processing unit (MPU), in accordance with embodiments of the invention.

FIG. 4 shows a block diagram of a match processing unit (MPU) 400, in accordance with embodiments of the invention. In some embodiments, the MPU unit 400 may comprise multiple functional units, memories and at least a register file. For example, the MPU unit may comprise an instruction fetch unit 401, a register file unit 407, a communication interface 405, arithmetic logic units (ALUs) 409 and various other functional units.

In the illustrated example, the MPU unit 400 may comprise a write port or communication interface 405 allowing for memory read/write operations. For instance, the communication interface may support packets written to or read from an external memory (e.g., high bandwidth memory (HBM) of a host device) or an internal static random access memory (SRAM). The communication interface 405 may employ any suitable protocol such as Advanced Microcontroller Bus Architecture (AMBA) Advanced extensible Interface (AXI) protocol. AXI is a bus protocol for a high-speed/high-end on-chip bus protocol and has channels associated with read, write, address, and write response, which are respectively separated, individually operated, and have transaction properties such as multiple-outstanding address or write data interleaving. The AXI interface 405 may include features that support for unaligned data transfers using byte strobes, burst based transactions with only start address issued, separate address/control and data phases, issuing of multiple outstanding addresses with out of order responses, and easy addition of register stages to provide timing closure. For example, when the MPU executes a table write instruction, the MPU may track which bytes have been written to (a.k.a. dirty bytes) and which remain unchanged. When the table entry is flushed back to the memory, the dirty byte vector may be provided to AXI as a write strobe, allowing multiple writes to safely update a single table data structure as long they do not write to the same byte. In some cases, dirty bytes in the table need not be contiguous and the MPU may only write back a table if at least one bit in the dirty vector is set. Though packet data is transferred according the AXI protocol in the packet data communication on-chip interconnect system according to the present exemplary embodiment in the present specification, it can also be applied to a packet data communication on-chip interconnect system operating by other protocols supporting a lock operation, such as Advanced High-performance Bus (AHB) protocol or Advanced Peripheral Bus (APB) protocol in addition to the AXI protocol.

The MPU 400 may comprise an instruction fetch unit 401 configured to fetch instruction set from a memory external to the MPU based on the input table result or at least a portion of the table result. The instruction fetch unit may support branches and/or linear code paths based on table results or a portion of a table result provided by a table engine. In some cases, the table result may comprise table data, key data and/or a start address of a set of instructions/ program. Details about the table engine are described later herein. In some embodiments, the instruction fetch unit 401 may comprise an instruction cache 403 for storing one or more programs. In some cases, the one or more programs may be loaded into the instruction cache 403 upon receiving the start address of the program provided by the table engine. In some cases, a set of instructions or a program may be stored in a contiguous region of a memory unit, and the contiguous region can be identified by the address. In some cases, the one or more programs may be fetched and loaded from an external memory via the communication interface 405. This provides flexibility to allow for executing different programs associated with different types of data using the same processing unit. In an example, when a management packet header vector (PHV) injected into the pipeline, for example to perform administrative table direct memory access (DMA) operations or entry aging functions (i.e., adding timestamps), one of the management MPU programs may be loaded to the instruction cache to execute the management function. The instruction cache 403 can be implemented using various types of memories such as one or more SRAMs.

The one or more programs can be any programs such as P4 programs related to reading table, building headers, DMA to/from memory regions in HBM or in the host device and various other actions. The one or more programs can be executed in any stage of a pipeline as described elsewhere herein.

The MPU 400 may comprise a register file unit 407 to stage data between the memory and the functional units of the MPU, or between the memory external to the MPU and the functional units of the MPU. The functional units may include, for example, ALUs, meters, counters, adders, shifters, edge detectors, zero detectors, condition code registers, status registers, and the like. In some cases, the register file unit 407 may comprise a plurality of general purpose registers (e.g., R0, R1, ... Rn) which may be initially loaded with metadata values then later used to store temporary variables within execution of a program until completion of the program. For example, the register file unit 407 may be used to store SRAM addresses, ternary content addressable memory (TCAM) search values, ALU operands, comparison sources, or action results. The register file unit of a stage may also provide data/program context to the register file of the subsequent stage, as well as making data/program context available to the next stage's execution data path (i.e., the source registers of the next stage's adder, shifter, and the like). In one embodiment, each register of the register file is 64 bits and may be initially loaded with special metadata values such as hash value from table, lookup, packet size, PHV timestamp, programmable table constant and the like, respectively.

In some embodiments, the register file unit 407 may also comprise comparator flags unit (e.g., C0, C1, . . . Cn) configured to store comparator flags. The comparator flags can be set by calculation results generated by the ALU which in return is compared with constant values in an encoded instruction to determine a conditional branch instruction. In an embodiment, the MPU may comprise eight one-bit comparator flags. However, it should be noted that MPU may comprise any number of comparator flag units each of which may have any suitable length.

The MPU 400 may comprise one or more functional units such as the ALU 409. The ALU may support arithmetic and logical operations on the values stored in the register file unit 407. The results of the ALU operations (e.g., add, subtract, AND, OR, XOR, NOT, AND NOT, shift, and compare) may then be written back to the register file. The functional units of the MPU may, for example, update or modify fields anywhere in a PHV, write to memory (e.g., table flush), or perform operations that are not related to PHV update. For example, the ALU may be configured to perform calculations on descriptor rings, scatter gather lists (SGLs), and control data structures loaded into the general purpose registers from the host memory.

The MPU 400 may comprise various other functional units such as meters, counters, action insert unit and the like. For example, the ALU may be configured to support P4 compliant meters. A meter is a type of action executable on a table match used to measure data flow rates. A meter may include a number of bands, typically two or three, each of which has a defined maximum data rate and optional burst size. Using a leaky bucket analogy, a meter band is a bucket filled by the packet data rate and drained at a constant allowed data rate. Overflow occurs if the integration of data rate exceeding quota is larger than the burst size. Overflowing one band triggers activity into the next band, which presumably allows a higher data rate. In some cases, a field of the packet may be remarked as a result of overflowing the base band. This information might be used later to direct the packet to a different queue, where it may be more subject to delay or dropping in case of congestion. The counter may be implemented by the MPU instructions. The MPU may comprise one or more types of counters for different purposes. For example, the MPU may comprise performance counters to count MPU stalls. The action insert unit may be configured to push the register file result back to the PHV for header field modifications.

The MPU may be capable of locking a table. In some case, a table being processed by a MPU may be locked or marked as "locked" in the table engine. For example, while an MPU has a table loaded into its register file, the table address may be reported back to the table engine, causing future reads to the same table address to stall until the MPU has released the table lock. For instance, the MPU may release the lock when an explicit table flush instruction is executed, the MPU program ends, or the MPU address is changed. In some cases, an MPU may lock more than one table addresses, for example, one for the previous table write-back and another address lock for the current MPU program.

MPU Pipelining

A single MPU may be configured to execute instructions until completion of the program. Alternatively or additionally, multiple MPUs may be configured to execute a program. In some embodiments, a table result may be distributed to multiple MPUs. The table result may be distributed to multiple MPUs according to a MPU distribution mask configured for the tables. This provides advantages to prevent data stalls or mega packets per second (MPPS) decrease when a program is too long. For example, if a PHV requires four table reads in one stage, then each MPU program may be limited to only eight instructions in order to maintain a 100 MPPS if operating at a frequency of 800 MHz in which scenario multiple MPUs may be desirable.

Any number of MPUs may be used for executing a program in order to meet a desirable performance. For instance, at least two, three, four, five, six, seven, eight, nine, or ten MPUs may be used to execute a program. Each MPU may execute at least a portion of the program or a subset of the instruction set. The multiple MPUs may perform the execution simultaneously or sequentially. Each MPU may or may not perform the same number of instructions. The configurations may be determined according to the length of program (i.e., number of instructions, cycles) and/or number of available MPUs. In some case, the configuration may be determined by an application instruction received from a main memory of a host device operably coupled to the plurality of MPUs.

P4 Pipelines

Figure 5:
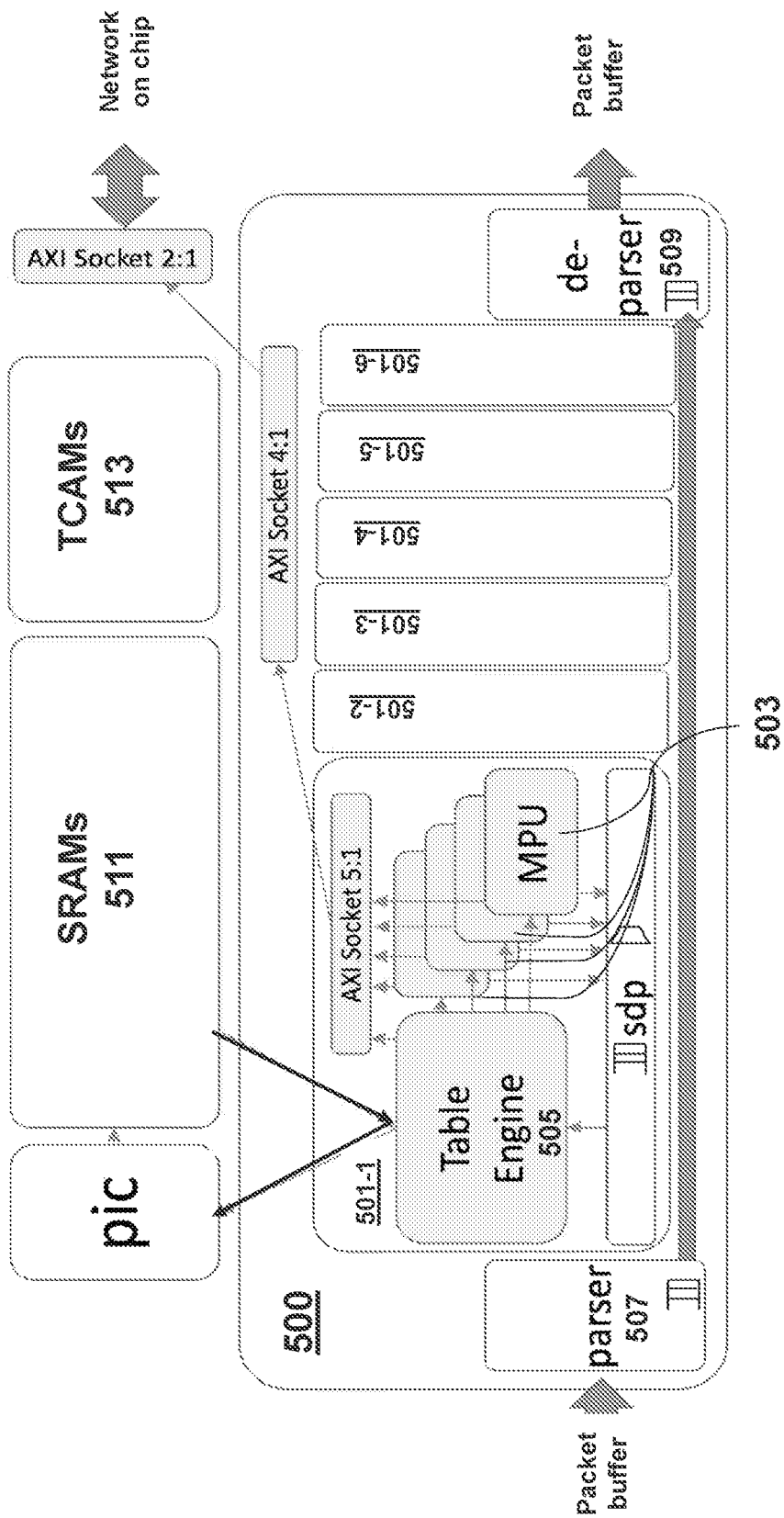
FIG. 5 shows a block diagram of an exemplary P4 ingress or egress pipeline (PIP pipeline) in accordance with embodiments of the invention.

In one aspect, a flexible, high performance match action pipeline which can execute a wide range of P4 programs is provided. The P4 pipeline can be programmed to provide various features, including, but not limited to, routing, bridging, tunneling, forwarding, network ACLs, L4 firewalls, flow based rate limiting, VLAN tag policies, membership, isolation, multicast and group control, label push/pop operations, L4 load balancing, L4 flow tables for analytics and flow specific processing, DDOS attack detection, mitigation, telemetry data gathering on any packet field or flow state and various others. FIG. 5 shows a block diagram of an exemplary P4 ingress or egress pipeline (PIP pipeline) 500 in accordance with embodiments of the invention.

In some embodiments, the provided invention may support a match+action pipeline. The programmer or compiler may decompose the packet processing program into a set of dependent or independent table lookup and action processing stages (i.e., match+action) which are mapped onto the table engine and MPU stages respectively. The match+action pipeline may comprise a plurality of stages. For example, a packet entering the pipeline may be first parsed by a parser (e.g., parser 507) according to the packet header stack specified by a P4 program. This parsed representation of the packet may be referred to as parsed header vector. The parsed header vector may then be passed through stages (e.g., stages 501-1, 501-2, 501-3, 501-4, 501-5, 501-6) of ingress match+action pipeline, wherein each stage is configured to match one or more parsed header vector fields to tables, then updates the packet header vector (PHV) and/or table entries according to the actions specified by the P4 program. In some instances, if the required number of stages exceeds the implemented number of stages, a packet may be recirculated for additional processing. In some cases, the packet payload may travel in a separate first-in-first-out (FIFO) queue until it is reassembled with its PHV in the de-parser (e.g., de-parser 509). The de-parser may rewrite the original packet according to the PHV fields which have been modified (e.g., added, removed, or updated). In some cases, the packet processed by the ingress pipeline may be placed in a packet buffer for scheduling and possible replication. In some cases, once the packet is scheduled and leaves the packet buffer, it may be parsed again to create an egress parsed header vector. The egress parsed header vector may be passed through a sequence of stages of match+action pipeline in a similar fashion of the ingress match+action pipeline, after which a final de-parser operation may be3 executed before the packet is sent to its destination interface or recirculated for additional processing.

In some embodiments, the ingress pipeline and egress pipeline may be implemented using the same physical block or processing unit pipeline. In some embodiments, the PIP pipeline 500 may comprise at least one parser 507 and at least one de-parser 509. The PIP pipeline 500 may comprise multiple parsers and/or multiple de-parsers. The parser and/or de-parser may be a P4 compliant programmable parser or de-parser. In some cases, the parser may be configured to extract packet header fields according to P4 header definitions and place them in the packet header vector (PHV). The parser may select from any fields within the packet and align the information from the selected fields to create a packet header vector. In some cases, after passing through a pipeline of match+action stages, the de-parser block may be configured to rewrite the original packet according to the updated PHV.

The packet header vector (PHV) produced by the parser may have any size or length. For example, the PHV may be a least 512 bits, 256 bits, 128 bits, 64 bits, 32 bits, 8 bits or 4 bits. In some cases, when a long PHV (e.g., 6 Kb) is desired to contain all relevant header fields and metadata, a single PHV may be time division multiplexed (TDM) across several cycles. This TDM capability provides benefit allowing the described invention to support variable length PHVs, including very long PHVs to enable complex features. A PHV length may vary as the packet passes through the match+action stages.

The PIP pipeline may comprise a plurality of match+action stages. After the parser 507 produces the PHV, the PHV may be passed through the ingress match+action stages. In some embodiments, the PIP pipeline may be implemented using multiple stage units 501-1, 501-2, 501-3, 501-4, 501-5, 501-6, each of which may comprise a table engine 505 and multiple MPUs 503. The MPU 503 can be same as the MPU as described in FIG. 4. In the illustrated example, four MPUs are used in one stage unit. However, any other number of MPUs, such as at least one, two, three, four, five, six, seven, eight, nine, or ten can be utilized or grouped with a table engine.

A table engine 505 may be configured to support per-stage table match. For example, the table engine 505 may be configured to hash, lookup, and/or compare keys to table entries. The table engine 505 may be configured to control table match process by controlling the address and size of the table, PHV fields to use as a lookup key, and MPU instruction vector which defines the P4 program associated with the table. A table result produced by the table engine may be distributed to the multiple MPUs 503.

The table engine 505 may be configured to control a table selection. In some cases, upon entering a stage, the PHV may be examined to select which table(s) to enable for the arriving PHV. Table selection criteria may be determined based on the information contained in the PHV. In some cases, a match table may be selected based on packet type information related to a packet type associated with the PHV. For instance, the table selection criteria may be based on packet type or protocols (e.g., Internet Protocol version 4 (IPv4), Internet Protocol version 6 (IPv6) and Multiprotocol Label Switching (MPLS)) or the next table ID as determined by the preceding stage or the previous stage. In some cases, the incoming PHV may be analyzed by the table selection logic, which then generates a table selection key and compares the result using a TCAM to select the active tables. The table selection Key may be used to drive table hash generation, table data comparison, and associated data into the MPUs.

In some embodiments, the table engine 505 may comprise a hash generation unit. The hash generation unit may be configured to generate a hash result off a PHV input and the hash result may be used to conduct a DMA read from a DRAM or SRAM array. In an example, the input to the hash generation unit may be masked according to which bits in the table selection key contribute to the hash entropy. In some cases, the same mask may be used by the table engine for comparison with the returning SRAM read data. In some instances, the hash result may be scaled according to the table size, then the table base offset may be added to create the memory index. The memory index may be sent to the DRAM or SRAM array and to perform the read.

In some cases, the table engine 505 may comprise a TCAM control unit. The TCAM control unit may be configured to allocate memory to store multiple TCAM search tables. In an example, a PHV table selection key may be directed to a TCAM search stage before a SRAM lookup. TCAM search tables can be configured to be up to 1024 bits wide and as deep as TCAM resources permit. In some cases, multiple TCAM tables may be carved from the shared quadrant TCAM resources. The TCAM control unit may be configured to allocate TCAMs to individual stages so that to prevent TCAM resource conflicts, or allocate TCAM into multiple search tables within a stage. The TCAM search index results may be forwarded to the table engine for SRAM lookups.

The PIP pipeline 500 may comprise multiple stage units 501-1, 501-2, 501-3, 501-4, 501-5, 501-6. The PIP pipeline may comprise any number of stage units such as at least two, three, four, five, six, seven, eight, nine, ten sage units that can be used within the PIP pipeline. In the illustrated example, six match+action stages units 501-1, 501-2, 501-3, 501-4, 501-5, 501-6 are grouped into a set. The set of stages units may share a common set of SRAMs 511 and TCAMs 513. The SRAMs 511 and TCAMs 513 may be component of the PIP pipeline. This arrangement may allow the six stage units to divide match table resources in any suitable proportion which provides convenience to the compiler and easing the complier's task of resource mapping. Any suitable number of SRAM resources and any suitable number of TCAM resources may be used by each PIP pipeline. For example, the illustrated PIP pipeline may be coupled to ten SRAM resources and four or eight TCAM resources. In some instances, TCAMs may be fused vertically or horizontally for a wider or deeper search.

Extended P4 Pipelines

In one aspect, the provided invention may support an extended P4 programmable pipeline to allow for direct interfacing with the host driver. The extended P4 programmable pipeline implements the IO device interface as described above. For example, the P4 programmed DMA interfaces may be directly coupled to the host virtual functions (VFs) as well as advanced RISC machine (ARM) CPU or offload engine interfaces. The extended P4 pipeline may handle required DMA operations and loops. The extended P4 pipeline may include features, including but not limited to, stateless NIC offloads such as TCP segmentation offload (TSO) and Receive Side Scaling (RSS); storage exchange table-style transaction servicing in the extended P4 pipeline; fine grained load balancing decisions that can be extended to individual data structures of performance critical applications, such as DPDK or key value matching; TCP flow termination and initiation for proxy services; RDMA over converged Ethernet (RoCE) and similar remote direct memory access (RDMA) protocol support; custom descriptor and SGL formats can be specified in P4 to match data structures of performance critical applications; new device and VF behaviors can be modelled using P4 programs coupled with host driver development, and various other features.

Data may be transmitted between the packetized domain in the P4 pipeline to/from the memory transaction domain in the host and NIC memory systems. This packet to memory transaction conversion may be performed by the extended P4 pipelines that include DMA write (TxDMA) and/or DMA read (RxDMA) operations. The extended P4 pipeline includes TxDMA may also be referred to as Tx P4 or TxDMA and the extended P4 pipeline includes RxDMA may also be referred to as Rx P4 throughout this specification. The extended P4 pipelines may comprise the same match+action stages in the P4 pipeline, and a payload DMA stage at the end of the pipeline. Packets may be segmented or reassembled into data buffers or memory regions (e.g., RDMA registered memory) according to the extended P4 programs. The payload DMA stage may be a P4 extension which enables the programmable P4 network pipeline extended to the host memory system and driver interface. This P4 extension allows custom data structures and applications interactions to be tailored to application or container needs.

The match table utilized in the extended P4 pipeline may be programmable tables. A stage of an extended P4 pipeline may include multiple programmable tables which may exist in SRAM, NIC DRAM, or host memory. For example, host memory structures may include descriptor rings, SGLs, and control data structures which can be read into the register file unit of the MPU for calculations. The MPU may add PHV commands to control DMA operations to and from host and NIC memory, and insert DMA commands into the PHV for execution by the payload DMA stage. The extended P4 programs may include, for example, completion queue events, interrupts, timer set, and control register writes and various others programs.

Figure 6:
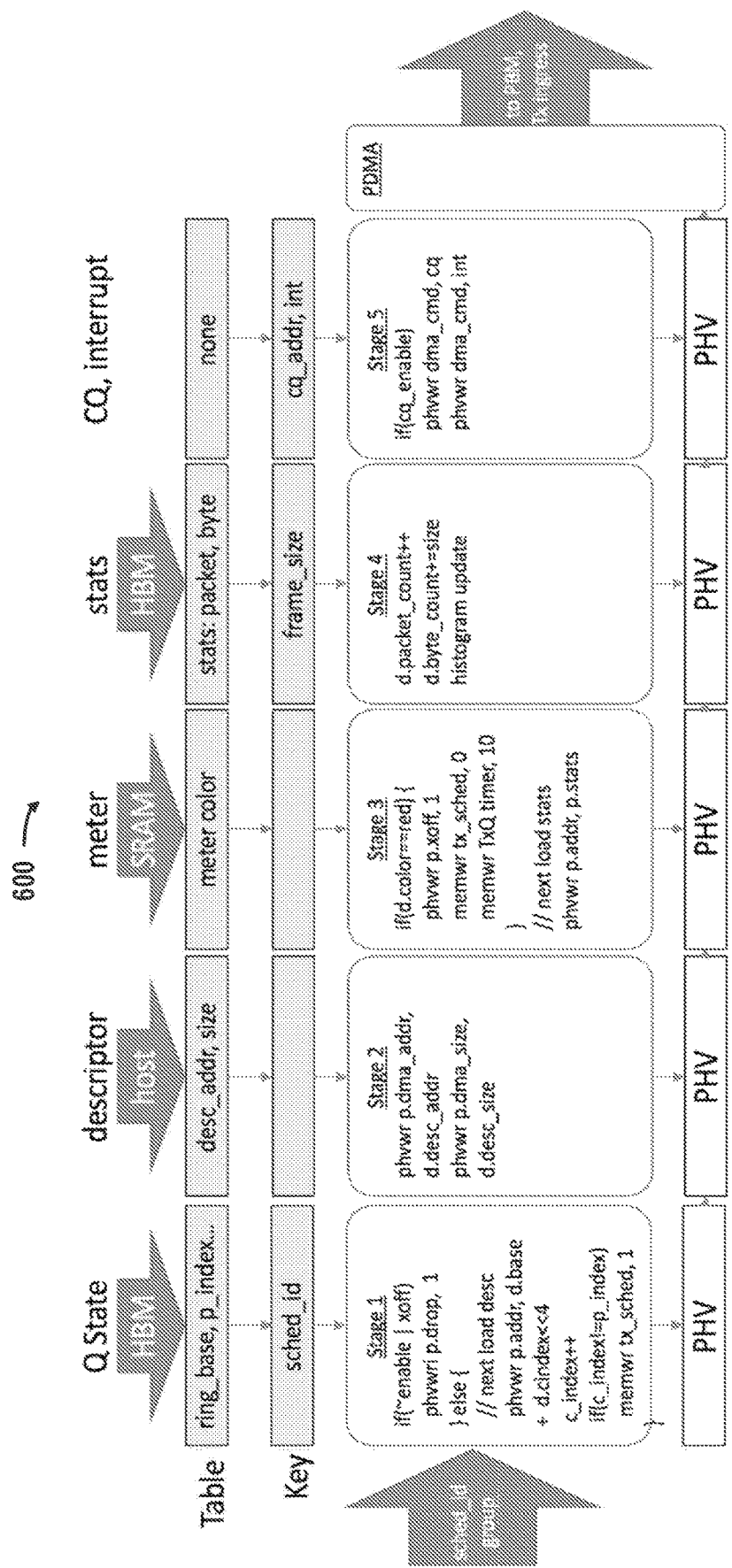
FIG. 6 illustrates an exemplary extended pipeline of stages for Ethernet packet transmission (i.e., Tx P4 pipeline)

FIG. 6 illustrates an exemplary extended pipeline of stages for Ethernet packet transmission (i.e., Tx P4 pipeline) 600. In the example, a table engine of stage 0 may fetch the queue state (e.g., Q state) table for processing by the MPUs of stage 0. In some cases, the queue state may also contain an instruction offset address based on the type of queue pairs in order to speed MPU processing. Other separate Tx P4 programs can be written for an Ethernet Tx queue, an RDMA command queue, or any new type of transmit DMA behavior customized to a particular application. The number of supported Tx queue pairs may be determined based on hardware scheduler resources assigned to each queue pair. As mentioned above, the PHV may be passed through each stage in which match+action programs may be executed by the stage unit associated therewith. The MPU of the final stage (e.g., stage 5) may insert DMA commands into the PHV for execution by the payload DMA stage (e.g., PDMA).

Figure 7:
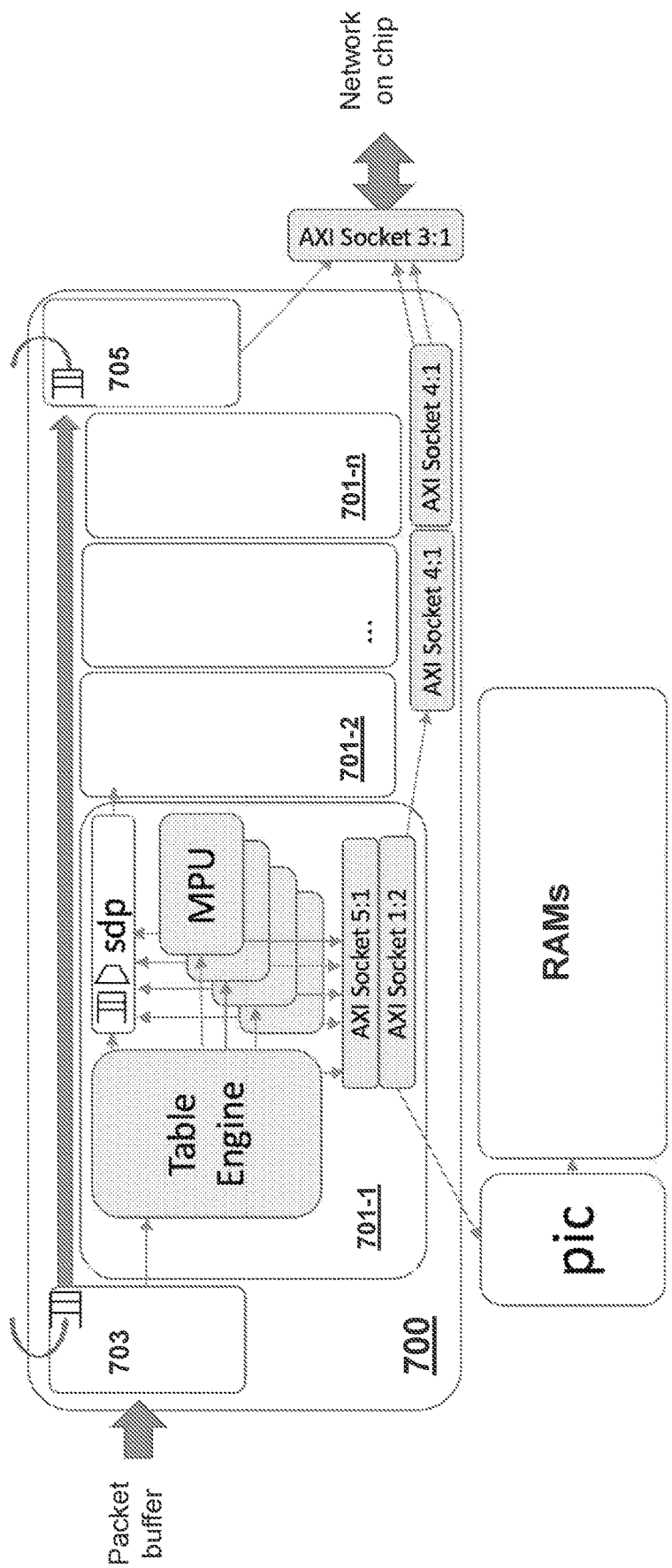
FIG. 7 shows exemplary Rx P4 pipeline, in accordance with embodiments of the invention.
Figure 8:
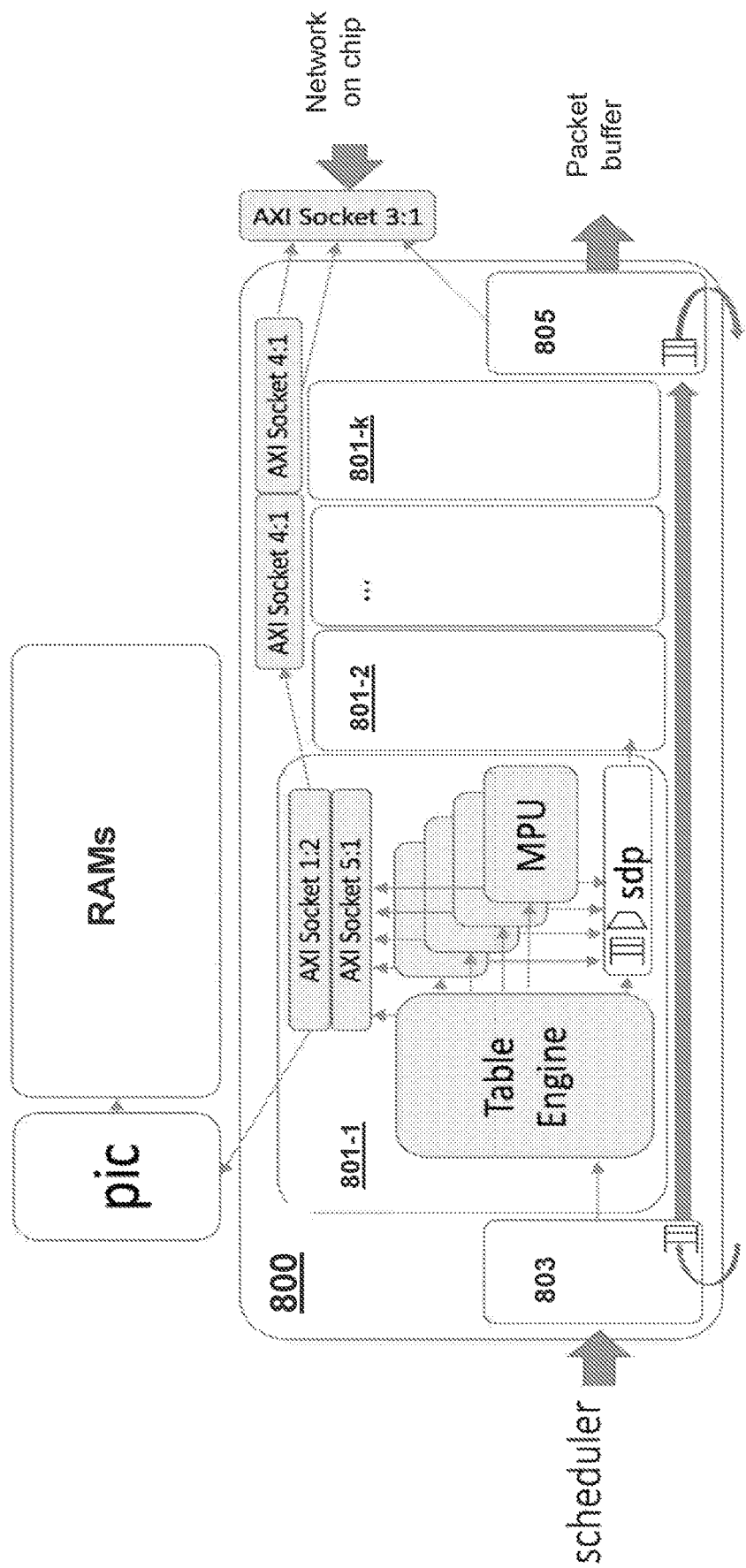
FIG. 8 shows exemplary Tx P4 pipeline, in accordance with embodiments of the invention.

FIG. 7 and FIG. 8 show exemplary Rx P4 pipeline 700 and Tx P4 pipeline 800 in accordance with embodiments of the invention. The Rx P4 stages and/or Tx P4 stages may be generally similar to the P4 pipeline stages as described elsewhere herein with a few different features. In some cases, the extended P4 stages may not use TCAM resources and may use less SRAM resources than P4 stages. In some cases, the extended P4 pipeline may comprise different number of stages than the P4 pipeline, by having a payload DMA stage at the end of the pipeline. In some cases, the extended P4 pipeline may have a local PHV recirculate data path that may not use packet buffer.

Referring to the Rx P4 pipeline (i.e., RxDMA P4 pipeline) as shown in FIG. 7, the Rx P4 pipeline may comprise multiple stage units 701-1, 701-2, . . . 701-n each of which may have the same physical block of the stage unit as described in FIG. 5. The number of stage units in the Rx P4 pipeline may or may not be the same as the number of stage units of a P4 pipeline as mentioned above. In an example, a packet may be passed to the Rx P4 pipeline from a P4 networking pipeline which may include P4 forwarding, isolation, multicast, L4 security, and other network features.

In some embodiments, the Rx P4 pipeline 700 may comprise a PHV splitter block 703 configured to generate an RxDMA PHV. For example, the metadata fields of the PHV (e.g., logical interfaces (LIF) ID) as required by the RxDMA may be passed from the P4 network pipeline through the packet buffer as a contiguous block of fields prepended to the packet. Before entering the first stage of RxDMA P4 pipeline, the PHV splitter block 703 may extract the prepended metadata and place it in the RxDMA PHV. The PHV splitter block 703 may maintain a count of number of PHVs that are currently in the RxDMA pipeline, as well as a count of number of packet payload bytes that are in the pipeline. In some cases, when either the PHV count or the total packet byte count exceeds a high water mark, the PHV splitter block 503 may stop accepting new packets from the packet buffer. This provides benefit to ensure that packets recirculated from the payload DMA block 705 have priority to be processed and exit the pipeline.

The Rx P4 pipeline may comprise a packet DMA block 705 configured to control ordering between dependent events. The packet DMA block may also be referred to as payload DMA block. A packet data may be sent in a FIFO to the packet DMA block 705 to await DMA commands created in the Rx P4 pipeline. The packet DMA block at the end of the Rx P4 pipeline may execute the packet DMA write commands, DMA completion queue (CQ) write commands, interrupt assertion writes, and doorbell writes in the order the DMA commands are placed in the PHV.

Referring to the Tx P4 pipeline 800 shown in FIG. 8, the Tx P4 pipeline may comprise multiple stage units 801-1, 801-2, . . . 801-k each of which may have the same physical block of the stage unit as described in FIG. 7. The number of stage units in the Tx P4 pipeline may or may not be the same as the number of stage units of an Rx P4 pipeline as described above. In an example, packets may be transmitted from a host or NIC memory using the Tx P4 pipeline. The Tx queue scheduler may select the next queue for service and submits the LIF, QID to the beginning of the Tx P4 pipeline.

The Tx P4 pipeline may comprise a null PHV block 803 configured to generate address to be read by the table engine in stage 0. The null PHV block 803 may also insert information such as LIF or LIF type to the intrinsic fields of the PHV. The null PHV block 803 may also insert recirculated PHVs back into the pipeline from the last stage of the Tx P4 pipeline, as well as insert software generated PHVs. The Tx P4 pipeline may comprise a packet DMA block 805 similar to the packet DMA block as described in FIG. 7.

In some embodiments, Tx DMA pipeline, Rx DMA pipeline, and P4 pipeline may be capable of inserting software generated PHVs before the first stage of the respective pipeline. Software may use generated PHVs to launch MPU programs, perform table modifications, or launch DMA commands from the extended P4 pipeline.

In an aspect, a system comprising the Tx DMA pipeline, Rx DMA pipeline, and P4 pipeline and other components may be provided. The system may support extended P4 pipeline based host interface features (e.g., DMA operations and loops), provide improved network performance (e.g., increased MMPS with reduced data stalls), fault detection and isolation, P4 based network features (e.g., routing, bridging, tunneling, forwarding, network ACLs, L4 firewalls, flow based rate limiting, VLAN tag policies, membership, isolation, multicast and group control, label push/pop operations, L4 load balancing, L4 flow tables for analytics and flow specific processing, DDOS attach detection, mitigation, telemetry data gathering on any packet field or flow state), security features and various others.

Figure 9:
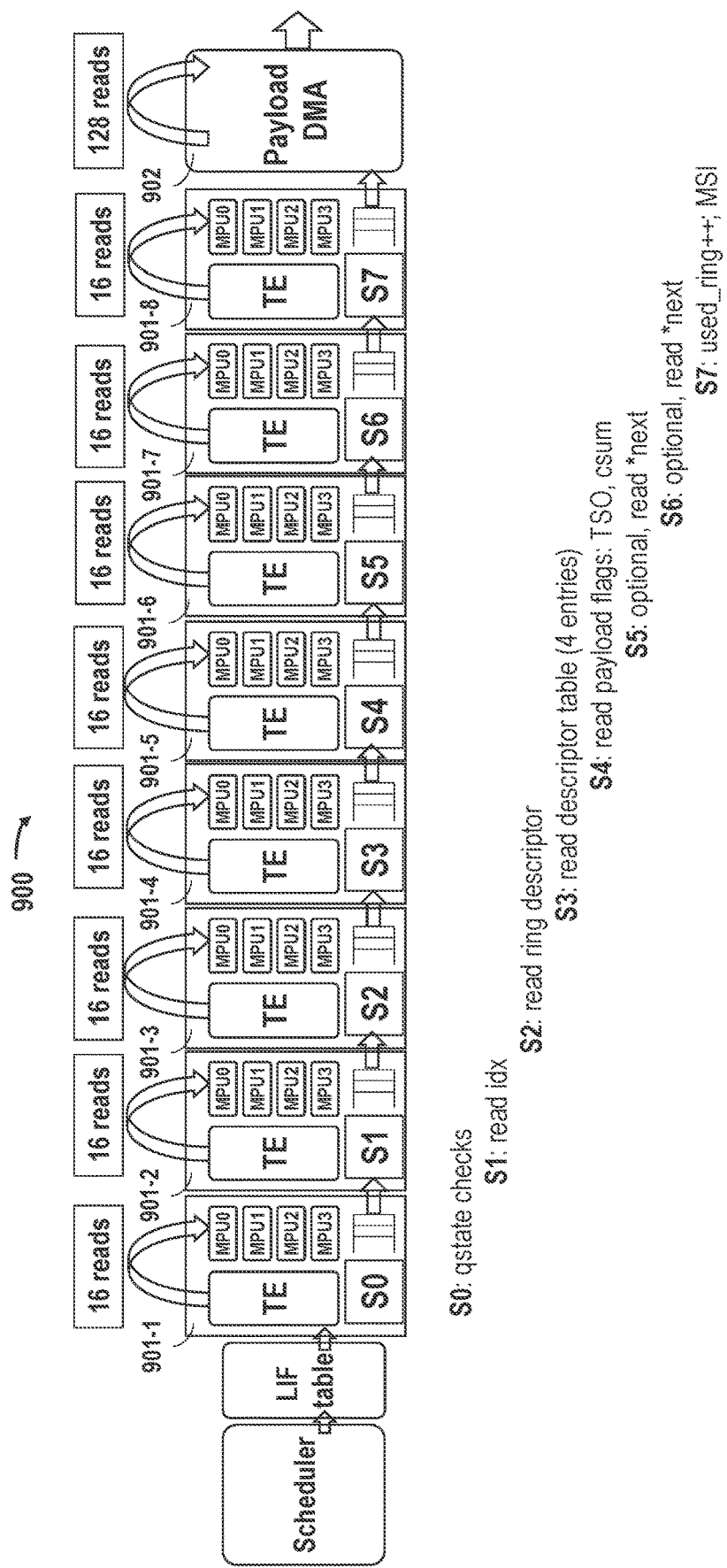
FIG. 9 illustrates an example of an extended transmission pipeline (i.e., TxDMA pipeline).

FIG. 9 illustrates an example of an extended transmission pipeline (i.e., TxDMA pipeline) 900. The provided IO device interface may support the TxDMA pipeline operations to transmit packets from a host system or NIC memory. The IO device interface may have improved performance such as a 16 reads per stage (i.e., 500 nsec host latency), 32 MPPS or higher for direct packet processing, and reduced latency. The provided IO device interface may comprise other features such as flexible rate limit controls. For example, logical interfaces (LIFs) can be independently rate limited by the Tx scheduler. Each LIF may have a private qstate array with a programmable base address in HBM and a programmable number of queues. The device interface may support a maximum of 2K or more LIFs. A LIF may contain eight or more queue types, with a programmable number of queues per queue type. For example, a qstate array may have a separate base address in HBM. This allows each LIF to scale the number and type of queue pairs it owns independently, up to a maximum array size determined at the time of virtual function creation. There may be one or more qstate types (e.g., eight qstate types) within a qstate array. Each type may have an independent entry size control as well as an independent number of entries. This allows each LIF to have a flexible mixture of queues of different types.

As aforementioned, the IO device interface may be a highly optimized ring based I/O queue interface. The extended P4 programs can be used to rate limit to a much finer granularity than the scheduler based rate limiter. An extended P4 program may rate limit to individual queue pairs using time and bucket data that are stored in qstate. The extended P4 rate limiting can be applied in the presence of scheduler (per-LIF) rate limiting, allowing per-VM or per-interface rates to be applied while per-queue limits enforce congestion or other fine-grained rate control. For example, the extended P4 rate limit programs may set XOFF status to a primary data transmission ring while leaving other rings for timers, administrative or congestion message transmit. In an exemplary process to implement a per-queue rate limited in the extended P4 pipeline, the program may first determine if the current queue is under or over its target rate. If determined to be over its target rate, the program may drop the current scheduler token and set a timer resource to re-schedule the queue at a time in the future calculated according to the current token level and rate. Next, the program may disable the queue's scheduler bit, but only for the rings in the flow controlled COS. The queue may not be scheduled again until a new doorbell event occurs for the ring, even if work remains to be done for the primary data transmission ring.

The TxDMA pipeline 900 as shown in FIG. 9 may comprise a pipeline of stage units 901-1, 901-2, . . . 901-8 and a payload DMA block 902. The multiple stage units 901-1, 901-2, . . . 901-8 each of which may have the same physical block of the stage unit as described in FIG. 8. In an example, packets may be transmitted from a host or NIC memory using the TxDMA pipeline. The Tx queue scheduler may select the next queue for service and submits the LIF, QID to the beginning of the TxDMA pipeline.

In some cases, a single queue may include up to eight or more rings to allow multiple event signaling options. Queues which are exposed to direct host control may contain at least one host accessible ring, typically the primary descriptor ring required by the queue type. Host access to the ring p_index may be mapped through a doorbell. The illustrated example shows multiple stages for implementing Virtio programs. A table engine (TE) of stage 0 may fetch the queue state (e.g., Q state) table for processing by the MPUs of stage 0. In some cases, the queue state may also contain an instruction offset address based on the type of queue pairs in order to speed MPU processing. Other separate TxDMA programs can be written for an Ethernet Tx queue, an RDMA command queue, or any new type of transmit DMA behavior customized to a particular application. The number of supported Tx queue pairs may be determined based on hardware scheduler resources assigned to each queue pair.

It is noted that various embodiments can be used in conjunction with one or more types of wireless or wired communication signals and/or systems, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, multi-carrier modulation (MDM), discrete multi-tone (DMT), Bluetooth, ZigBee™, or the like. Embodiments of the invention may be used in various other devices, systems, and/or networks.

While preferred embodiments of the present subject matter have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the subject matter described herein may be employed in practicing the invention.

What is claimed is:

1. A method for a programmable IO device interface comprising: providing programmable device registers, a DMA block, and a pipeline of match processing units (MPUs), wherein each match processing unit (MPU) comprises a plurality of functional units and a memory and is configured to perform table-based actions, wherein the programmable IO device interface is configured to perform at least the following:
   a) receive a packet comprising a header portion and a payload portion, wherein the header portion is used to generate a packet header vector;
   b) produce, with aid of a table engine, a table result by performing packet match operations, wherein the table result is generated based at least in part on the packet header vector and data stored in a programmable match table;
c) receive, at at least one MPU from the pipeline of MPUs, the table result and an address of a set of instructions associated with the programmable match table;
d) perform, by one or more MPUs from the pipeline of MPUs, one or more actions according to the set of instructions until completion of the instructions, wherein the one or more actions comprise inserting a DMA command into the packet header vector; and
e) perform, by the DMA block, a DMA operation according to the inserted DMA command in the packet header vector.

2. The method of claim 1, further comprising providing the header portion to a succeeding circuit, wherein the succeeding circuit is configured to assemble the header portion to the corresponding payload portion.

3. The method of claim 1, wherein the programmable match table comprises DMA register tables, descriptor formats, or control register formats.

4. The method of claim 3, wherein the programmable match table is selected based on packet type information related to a packet type associated with the header portion.

5. The method of claim 3, wherein the programmable match table is selected based on an ID of the match table selected by the table engine.

6. The method of claim 1, wherein the table result comprises a key related to the programmable match table and the match result of the match operation.

7. The method of claim 1, wherein a memory unit of the match processing unit is configured to store a plurality sets of instructions.

8. The method of claim 7, wherein the plurality sets of instructions are associated with different actions.

9. The method of claim 7, wherein the plurality sets of instructions is stored in a contiguous region of the memory unit and the contiguous region is identified by the address of the set of instructions.

10. The method of claim 1, wherein the one or more actions further comprise updating the programmable match table, updating a memory based data structure, or initiating an event.

11. The method of claim 1, further comprising locking the match table for an exclusive access by the at least one MPU while the match table is processed by the MPU.

12. The method of claim 1, wherein a plurality of packets are processed in a stalling-free manner.

13. An apparatus with a programmable IO device interface comprising:
a) a first memory unit having a plurality of programs stored thereon, wherein the plurality of programs are associated with a plurality of actions comprising inserting a DMA command into a packet header vector;
b) a second memory unit for receiving and storing a table result, wherein the table result is provided by a table engine configured to perform packet match operations on (i) the packet header vector contained in a header portion of a packet and (ii) data stored in a programmable match table; and
c) a pipeline of match processing units (MPUs), wherein each match processing unit (MPU) comprises a plurality of functional units and a memory, and wherein the pipeline of MPUs is configured for executing a program selected from the plurality of programs in response to the table result and an address received by at least one MPU from the pipeline of MPUs, wherein the program is executed until completion and the program is associated with the programmable match table.

14. The apparatus of claim 13, wherein the apparatus is configured to provide the header portion to a succeeding circuit and wherein the header portion is modified by the pipeline of MPUs.

15. The apparatus of claim 14, wherein the succeeding circuit is configured to assemble the modified header portion to the corresponding payload portion.

16. The apparatus of claim 13, wherein the programmable match table comprises DMA register tables, descriptor formats, or control register formats.

17. The apparatus of claim 16, wherein the programmable match table is selected based on packet type information related to a packet type associated with the header portion.

18. The apparatus of claim 16, wherein the programmable match table is selected based on an ID of the match table selected by the table engine.

19. The apparatus of claim 13, wherein each of the plurality of programs comprises a set of instructions stored in a contiguous region of the first memory unit, and the contiguous region is identified by the address.

20. The apparatus of claim 13, wherein the plurality of actions comprise updating the programmable match table.

21. The apparatus of claim 13, wherein the circuitry is further configured to lock the programmable match table for an exclusive access by the apparatus while the match table is processed by the apparatus.

22. The apparatus of claim 13, wherein the plurality of actions further comprise updating the programmable match table, updating a memory based data structure, or initiating an event.

23. The apparatus of claim 13, wherein the memory based data structure comprises at least one of the following: a management token, an administrative command, and one or more processing tokens for initiating an event.

24. A system comprising a plurality of apparatuses of claim 19, wherein the plurality of apparatuses are coordinated to perform the set of instructions or the plurality of actions concurrently or sequentially according to a configuration.

25. The system of claim 24, wherein the configuration is determined by an application instruction received from a main memory of a host device operably coupled to the plurality of apparatuses.

26. The apparatus of claim 13, wherein the apparatus comprises a succeeding circuitry to perform a DMA operation according to the inserted DMA command in the packet header vector.

* * * * *